United States Patent [19]

Menocal

[11] 4,002,388
[45] Jan. 11, 1977

[54] STAB ARRANGEMENT FOR BUSBARS
[75] Inventor: Gustavo A. Menocal, Delran, N.J.
[73] Assignee: I-T-E Imperial Corporation, Spring House, Pa.
[22] Filed: Nov. 20, 1975
[21] Appl. No.: 633,622
[52] U.S. Cl. .................. 339/22 B; 174/72 B; 317/119; 339/32 R; 339/198 N
[51] Int. Cl.² .................. H01R 13/04; H02B 1/04
[58] Field of Search ............. 174/68 B, 70 B, 71 B, 174/72 B, 99 B; 317/112, 118, 119, 120; 339/19, 22 B, 32 R, 32 M, 33, 198 R, 198 N, 222

[56] References Cited
UNITED STATES PATENTS

| | | | |
|---|---|---|---|
| 1,536,149 | 5/1925 | Schmid | 339/19 X |
| 3,309,580 | 3/1967 | Jacobs et al. | 317/119 |
| 3,349,292 | 10/1967 | Meacham | 317/120 |
| 3,375,411 | 3/1968 | Mrowka | 317/119 |
| 3,402,328 | 9/1968 | Gryctko | 317/119 |
| 3,404,315 | 10/1968 | Jacobs et al. | 317/119 |
| 3,769,553 | 10/1973 | Coley | 317/119 |

Primary Examiner—Laramie E. Askin

[57] ABSTRACT

The stabs on a busbar for mechanically and electrically receiving circuit breakers, or the like, are shaped so as to have two mutually perpendicular contact plug-in elements on a single stab enabling the single stab to receive circuit breaker contacts that are oriented in mutually perpendicular directions.

10 Claims, 8 Drawing Figures

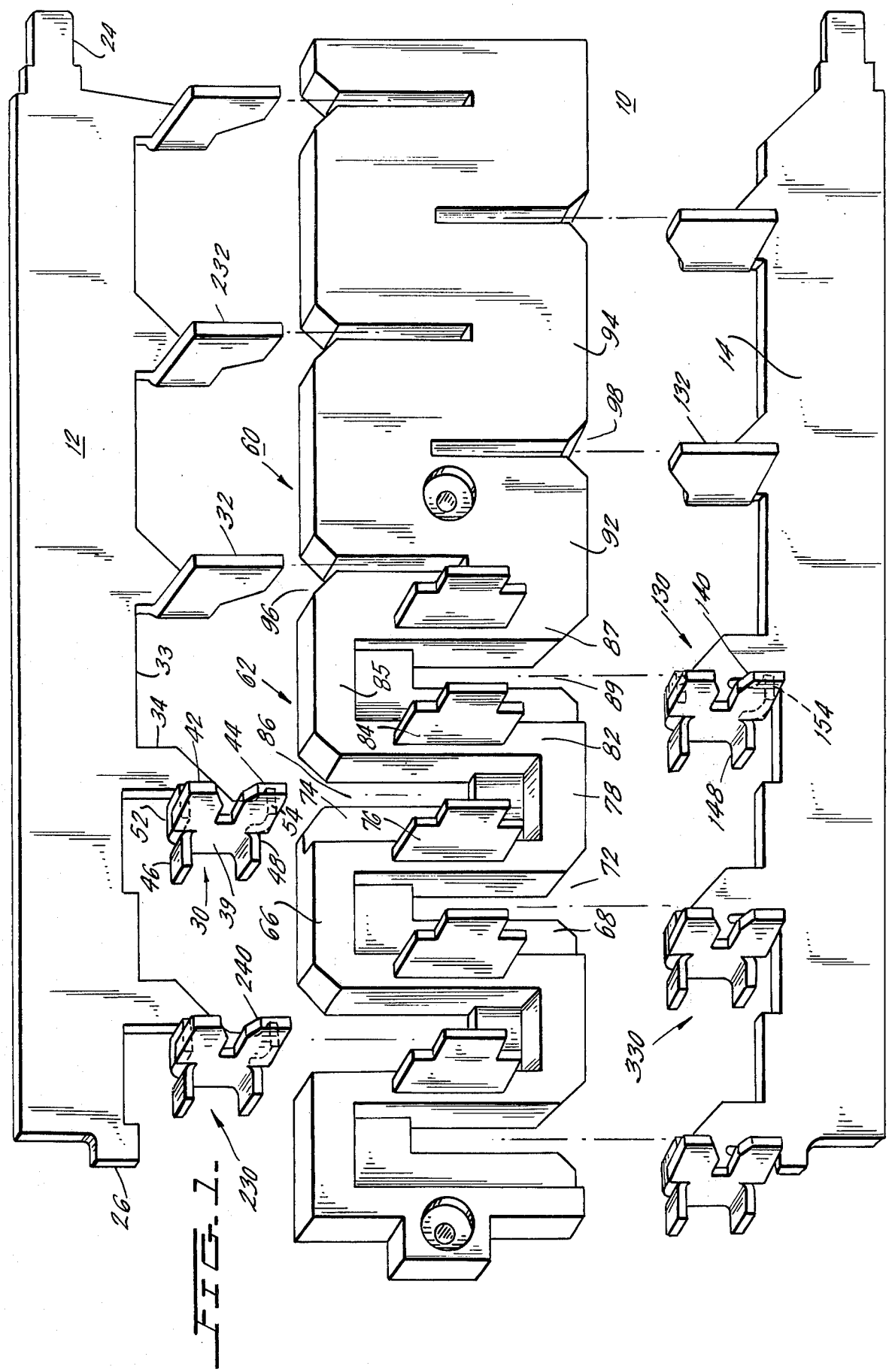

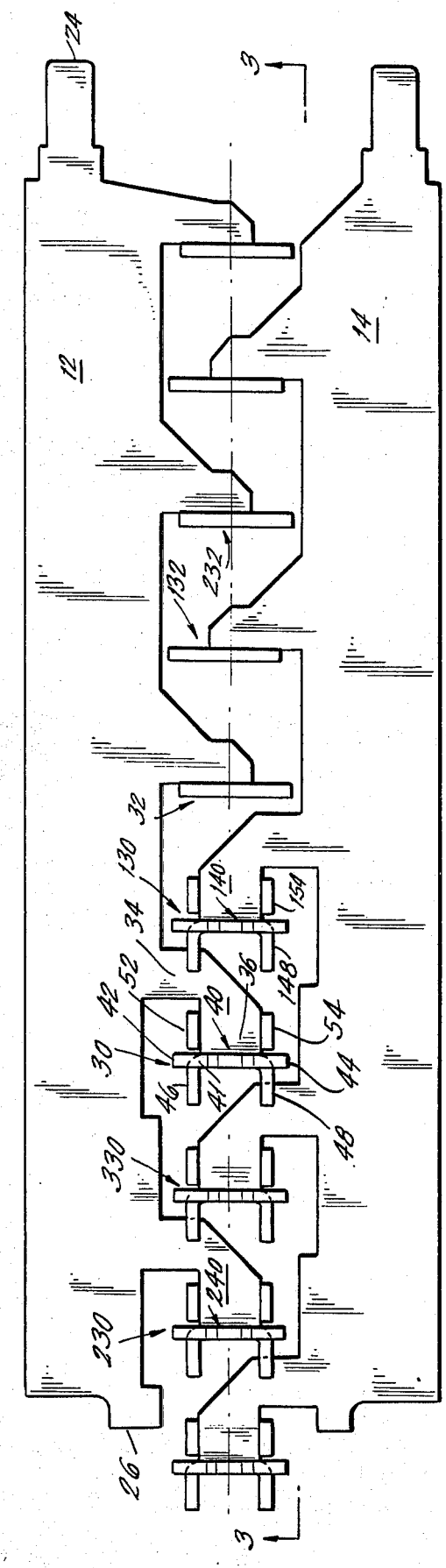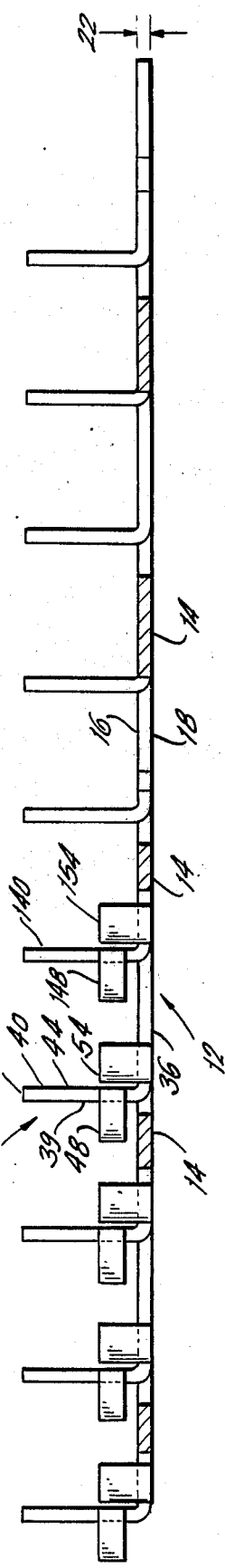

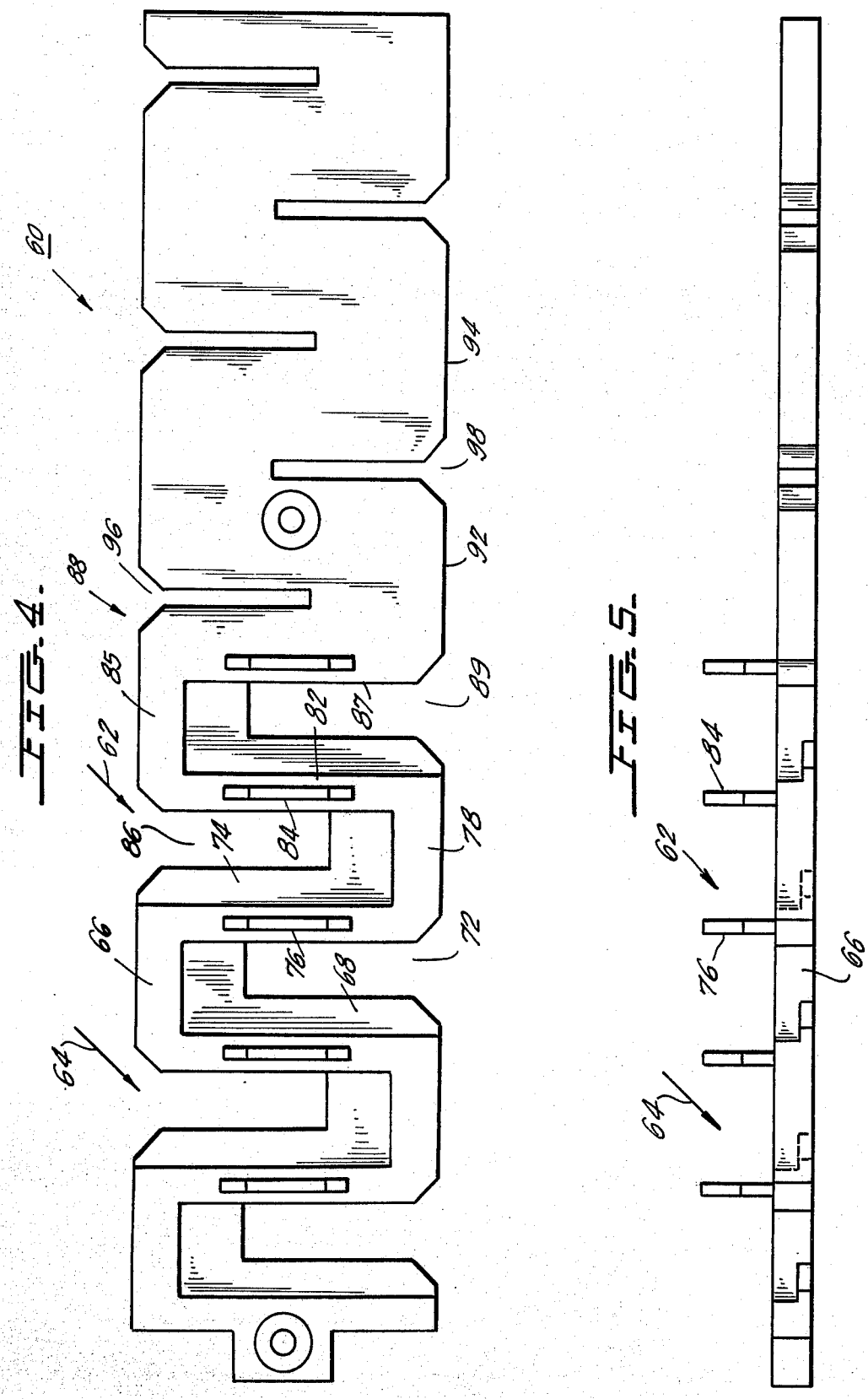

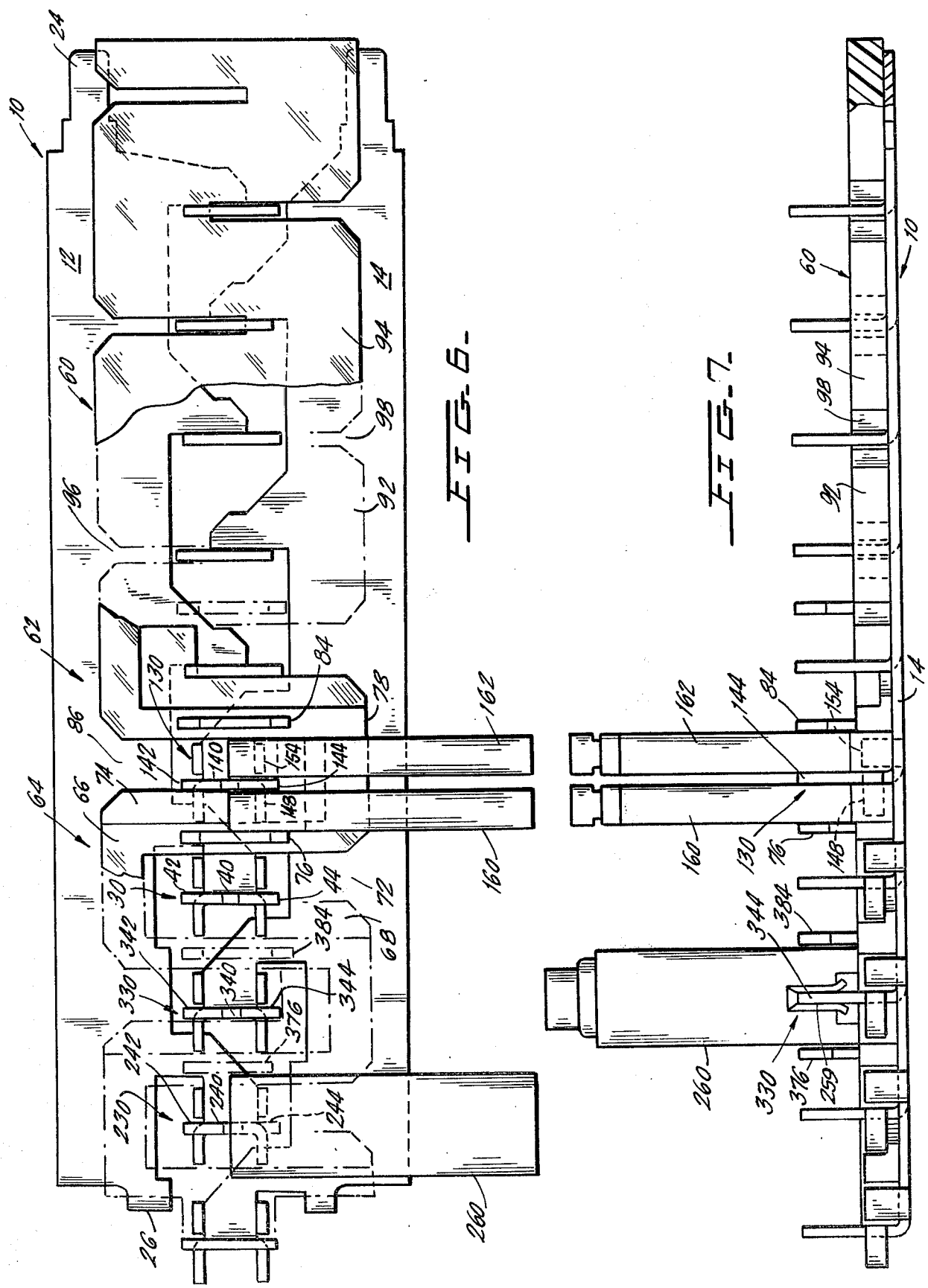

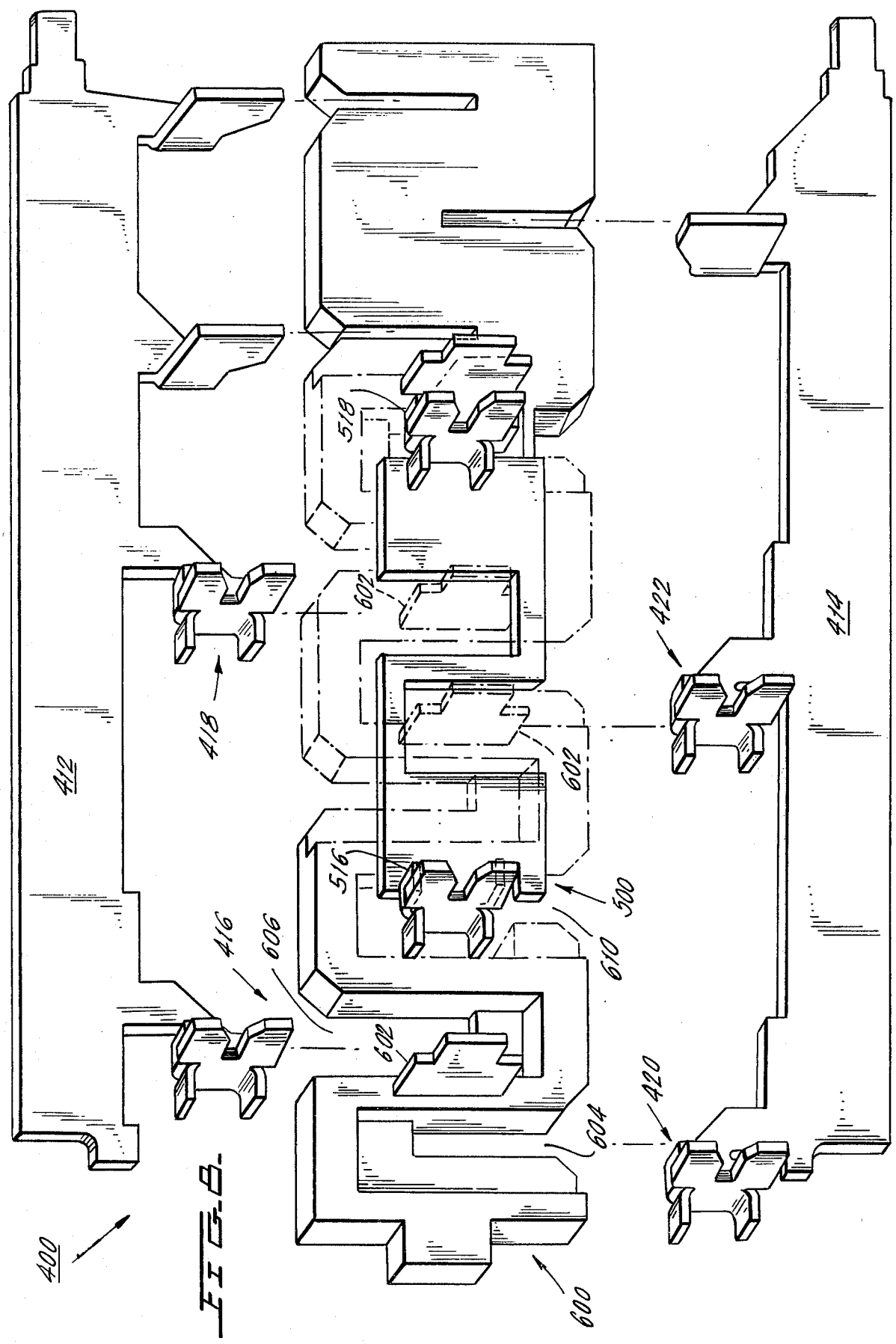

STAB ARRANGEMENT FOR BUSBARS

BACKGROUND OF THE INVENTION

This invention relates to electric power distribution systems in general and to load centers for such systems and more particularly to the busbars and the contact stabs on the busbars used in such systems.

The present invention is particularly adapted for use in a load center of the type shown in U.S. Pat. No. 3,349,292 issued Oct. 24, 1967 to James F. Meacham, and this patent is incorporated herein by reference, particularly with respect to its showing of an environment in which the present invention might be used and its description of an arrangement of busbars in single phase and three phase installations. See also U.S. Pat. Nos. 3,402,328 and 3,767,977.

A busbar of the type adapted for the present invention comprises an elongated strip or ribbon of conductive material. Projecting above one surface of the strip at spaced intervals along its length are a plurality of stab connections to be plugged into stab receiving cooperating contacts at the line side of a circuit breaker, or the like equipment. Hereinafter, a circuit breaker is described as the equipment to be mechanically and electrically plugged onto a busbar stab. But it should be understood that any other electrical equipment or electric contact carrying means may be plugged onto the stab.

A circuit breaker line contact which receives a busbar stab may be comprised of a U-shaped clip having two arms. The clip arms open outwardly of the breaker and are normally spaced apart a distance such that the stab is forced between the arms of the clip and the clip arms are inwardly biased against the stab to make secure mechanical and electrical contact.

There are different manufacturers of circuit breakers, different sizes of circuit breakers, different styles of circuit breakers and different current ratings of circuit breakers. As a result, there are in common use circuit breakers having stab receiving line contacts with an opening between then that is oriented parallel to the long, length dimension of the circuit breaker (see U.S. Pat. No. 3,402,328 and 3,349,292) and other circuit breakers having stab receiving line contacts with an opening between them that is oriented parallel to the narrower, width dimension of the circuit breakers (see U.S. Pat. No. 3,767,977). Furthermore, the former type circuit breakers have conventionally been emplaced in one inch wide casings while the latter type circuit breakers have been emplaced in half-inch wide casings.

It is now conventional to design busbars with each individual stab thereon adapted to receive only one type of circuit breaker, i.e. with its line contacts oriented in only one directin and/or where the circuit breakers have half-inch wide or inch wide casings. (See U.S. Pat. No. 3,333,157 for one effort to deal with this.) Furthermore, each such busbar stab is usually able to support only one circuit breaker extending away from the stab in one direction and is not able to support two neighboring circuit breakers extending in the same direction.

SUMMARY OF THE INVENTION

The invention is directed toward a busbar having stabs to be plugged into circuit breaker contacts oriented either parallel to the length or to the width dimension of the circuit breaker casing and where the circuit breakers have either one-inch or half-inch wide casings.

Each stab unit designed in accordance with the invention includes an upstanding central portion which projects above and is preferably perpendicular to the surface of the busbar. Atop the central portion is a first upwardly projected stab, which is oriented with its length dimension for being plugged into line contacts that are oriented parallel to the long, length dimension of a circuit breaker casing.

At at least one side of and preferably at both sides of the first stab, at least one second stab is formed which also projects upwardly above and is preferably perpendicular to the surface of the busbar and which is oriented with its length dimension perpendicular to the first stab. Each second stab is usually shorter in height then the first stab and all second stabs are the same height. Preferably, a pair of second stabs is defined beside each long side of the central, first stab. The stabs of each pair of second stabs are gap separated sufficiently such that a circuit breaker might be plugged onto one of the stabs of a pair. When there are second stabs at both sides of the first stab, two half-inch wide circuit breakers could be plugged in next to each other, one on a second stab at one side of the first stab and the other on a second stab at the other side of the first stab.

In accordance with a preferred development of the invention, one pair of the second stabs is formed by cutting and bending into the proper position the usually uncut and undisturbed material forming the central portion of the stab unit. The second pair of second stabs is formed by cutting and bending the usually uncut and undisturbed material of the support arm that projects from the busbar and is attached at the base of the stab central portion.

The above noted stab unit construction has a number of benefits. A single type of busbar can be used for different size circuit breakers and for circuit breakers having different line contact orientations, thereby cutting down an equipment supplier's need for a large inventory of different busbars having each type of stab. The entire busbar with its various stabs is of one-piece construction for ease of manufacture. The different stabs are obtainable using the same formation tools and are obtained from the same busbar material.

Accordingly, it is the primary object of the present invention to provide an improved busbar for use in load centers, or the like.

It is another object of the present invention to provide an improved plug-in contact receiving stab unit on such a busbar.

It is yet another object of the invention to provide a stab arrangement adaptable for use with different width circuit breakers.

It is a further object of the invention to provide such a stab arrangement which is adaptable for use with circuit breaker line contacts having different, mutually perpendicular orientations.

It is still a further object of the invention to be able to support a plurality of circuit breakers aligned next to each other on a stab unit.

It is yet another object of the invention to provide such a stab arrangement which is readily manufactured.

These and other objects of the invention will become apparent from the following description of the accompanying drawings.

BRIEF DESCRIPTION OF THE DRAWINGS

FIG. 1 is a perspective view of a single phase busbar assembly according to the invention showing stabs designed in accordance with the invention;

FIG. 2 is a top plan view of a busbar assembly of the type shown in FIG. 1 without an insulator;

FIG. 3 is a side elevational view along the line and in the direction of arrows 3—3 in FIG. 2 of one busbar of the busbar assembly;

FIG. 4 is a top plan view of an insulator assembly for use in connection with the present invention;

FIG. 5 is a side elevational view of the insulator assembly of FIG. 4;

FIG. 6 is a top plan view illustrating the manner in which the busbars in FIG. 2 cooperate with the insulator assembly of FIG. 4;

FIG. 7 is a side view of the apparatus of FIG. 6; and

FIG. 8 is a perspective view of a modified three-phase busbar assembly in accordance with the invention.

DETAILED DESCRIPTION OF THE PREFERRED EMBODIMENTS

The preferred embodiments of the present invention are adapted for use in the load center of U.S. Pat. No. 3,349,292, incorporated herein by reference.

Referring to FIGS. 1, 2, 6 and 7, a busbar arrangement 10 for a single phase load center is illustrated. It comprises a pair of busbars 12, 14 which are secured in position in the manner discussed in the aforesaid patent. Busbar 12 will be discussed in detail, it being understood that busbar 14 is essentially a mirror image. The entire busbar and the below described stab units thereof are formed from a single sheet of conductive metal, generally copper, which can be easily cut and bent to form the shaped busbar shown in the drawings and which is sufficiently rigid to retain its shape. Between its upper and lower surfaces 16, 18, respectively, busbar 12 has a thickness dimension 22 sufficient for rigidity and for effective electric power transmission. Busbar 12 extends between its terminals 24, 26. It is of sufficient width to provide material for the below described stab units 30, 230, et al and of enough width to be able to handle the level of current it is designed to carry.

Extending laterally from one side of busbar 12 are a plurality of stab units 30, 230 and other identical stab units on busbar 12 (not shown) in accordance with the invention. At the option of the designer of the arrangement, a second plurality of stabs 32, 232, et al. in accordance with the prior art, such as the aforesaid patent may also be provided.

Busbar 14 has a corresponding plurality of identical inventive stab units 130, 330, et al. and a corresponding plurality of identical prior art stab units 132, 332, et al.

All of the stab units 30, 230, et al are formed from the material of the busbar 12 and are in fact cut from the side of the busbar and then bent or shaped to the shapes and positions shown in the drawings. One stab unit 30 is now described, it being understood that all other stab units 130, 230, 330, et al. ar identical. Extending laterally from the side edge 33 of busbar 12 is the stab connecting portion 34, which extends and curves into the stab support arm 36. At the end of arm 36, the busbar material is bent and redirected perpendicularly and vertically above or forward of the surface 18 of the busbar 12 to define the upstanding, vertical stab central portion 39. Atop central portion 39 is the first stab 40, which projects vertically above and perpendicular to the busbar surface 16. Stab 40 has a flat top surface 41 and comprises gap separated side sections 42, 44, each section adapted to be comfortably plugged into a respective circuit breaker. Each of side sections 42, 44 of stab 40 is of sufficient length that it could be plugged into the clip line contacts 259 of one circuit breaker 260. In FIG. 7, see stab 340 whose side sectin 344 is plugged into contacts 259 of breaker 260. Breaker 260 extends across busbar 14 and outwardly of stab sectin 344. Another circuit breaker (not shown) could be plugged onto stab side section 342 and that breaker would extend in the opposite direction, across busbar 12.

Referring to FIGS. 1–3, beneath first stab 40, the material of its support 39 has been cut and bent sideways to define a first pair of spaced apart second stabs 46, 48, which extend perpendicularly above busbar surface 16, are of necessity, shorter in height than stab 40, are both of the same height and are oriented perpendicular to stab 40.

Support arm 36 which leads to central portion 39 is cut to form tabs which are then bent upwardly to define a second pair of spaced apart second stabs 52, 54, which are the same height as stabs 46, 48, and are beside the opposite elongated side of stab 40 from stab pair 46, 48. Second stabs 52, 54 also extend perpendicularly above busbar surface 16, are also oriented perpendicular to stab 40. Stabs 46, 48, 52, 54 are all of proper length, width and height to be plugged into a circuit breaker 160 havings its line contacts correspondingly oriented. Stabs 46, 48, 52, 54 each have a flat top surface adapted to be comfortably plugged into the line contact of a circuit breaker. The respective stabs 46, 52 and 48, 54 are aligned for receiving and aligning neighboring circuit breakers ona single stab unit 30. It is intended that stabs 46 and 52 be plugged into circuit breakers which extend from these respective stabs over and across busbar 12. It is similarly intended that stabs 48, 54 be plugged into circuit breakers which extend in the opposite direction away from busbar 12.

Referring to stab unit 130 in FIGS. 6 and 7, there is plugged onto stab 148 a first half-inch wide casing circuit breaker 160. At the option of the user of the system, another half-inch wide circuit breaker 162 may be plugged onto the stab 154 of the stab pair on the opposite side of stab 140, whereby the two half-inch wide circuit breakers may be plugged onto a single stab unit 130 and they will be aligned.

Referring to stab unit 230 in FIG. 6 and to stab unit 330 in FIG. 7, a one-inch wide casing circuit breaker 260 has its line contact clip arms 259 oriented to be plugged onto the stabs 240, 340. With a one-inch wide casing circuit breaker and also with a circuit breaker whose line contact arms are oriented like those in circuit breaker 260, only one circuit breaker may be plugged onto a stab 240, 340.

Stabs 32, 132, et al are not further described since they already appear in the prior art. Such a stab is also adapted to be plugged into the line contacts of breaker 260, as described in the prior art.

As shown in FIGS. 1, 6 and 7, busbars 12 and 14 are positioned with respect to and are electrically separated from each other by insulator assembly 60, which is comprised of insulator elements 62, 64, et al., which are attached together, as, for example, described in the prior art. Element 62 will be described, it being understood that element 64 and the other such elements are substantially identical.

Assembly 62 starts just to the right of the upper lengthwise extending leg 66 of insulator element 64. Assembly 62 comprises the transverse leg 74 which supports the upstanding insulating shield 76 between adjacent stabs, the lower lengthwise extending horizontal leg 78, the joining transverse leg 82 which supports the upstanding insulating shield 84 and the lengthwise extending leg 85. Leg 74 together with adjacent leg 66 and leg 68 from the neighboring insulator unit 64 define the notch 72 for stab unit 30. Legs 82, 74 and 78, define the notch 86 for stab unit 130. Legs 82 and 85, together with leg 87 of neighboring insulator element 88 define notch 89. The upstanding insulating shields 76, 84, et al. prevent arcing over between the adjacent stabs which are connected to the differently charged busbars 12, 14, especially because the longitudinally extending second sets of stabs on the various stab units are so close together as to raise the danger of arcing over.

In association with the stabs 32, 132, etc., the insulator units 92, 94, et al. are somewhat different in that they are shaped to define relatively narrow slots 96, 98, et al. for receiving the stabs 32, 132, et al., respectively. The stabs 32, 132, et al. are sufficiently far apart as to not create any danger of flashover and no shields like 76, 84 need be provided.

Attention is now directed to FIG. 8 where a three-phase assembly 400 is illustrated.

The assembly 400 is comprised of the outer busbars 412, 414 which are structurally quite similar to busbars 12, 14 respectively and is comprised of the third, central busbar, 500 which cooperates with busbars 412, 414. Busbar 412 includes a plurality of stab units 416, 418, et al. designed in accordance with the present invention. Busbar 414 includes its respective plurality of stab units 420, 422, et al in accordance with the invention. Comparing the busbar arrangement of FIGS. 1 and 8, and referring to busbars 12 and 412, respectively, the principal difference between these busbars lies in the spacing distance between the stab units 230, 30 in FIG. 1 and 416, 418 in FIG. 8. In FIG. 1, the stab units 230, 30 alternate only with stab units 330, 130, etc. on busbar 14. With the assembly of FIG. 8, since there are three busbars, the stab units 416, 418 of busbar 412 alternate not only with the stab units 420, 422 of busbar 414 but also with below described stab units 516, 518 of busbar 500.

Central busbar 500 is provided with a plurality of stab units 516, 518, et al., arrayed along its length. These stab units would be formed similarly to the stab units on the other busbars 412, 414, namely by first being cut from and then being shaped from the cut material of the busbar 500. The stab units 516, 518, inastead of projecting from a side edge of the busbar 500, are formed from the central portion of the busbar 500, thereby to be properly positioned with respect to the stab units of the other busbars when the three busbars are assembled together in insulator assembly 600.

When the busbars 412, 414, 500 are assembled together, the stab units alternate, with stab unit 420 being followed, moving left to right, by stab units 416, 516, 422, 418, 518, etc.

An insulator assembly 600 is formed according to the same principles as the insulator assembly 60 of FIG. 4, with a plurality of upstanding insulating shields 602 located to electrically separate adjacent stab units. The various notches 604, 606, etc., are formed in the insulator 600 and are so positioned and shaped as to receive their respective stab units therein. Notch 610 must be large enough in width that the stab unit 516 may poke through from beneath, without having to be slid in from the side, as the stab units of busbars 412 and 414 are slid. In other respects, the insulator 600 and the busbars themselves are so shaped and formed as to not physically contact or interfere with each other when the entire assembly has been assembled.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

I claim:

1. A bus bar contact stab structure formed integrally from a single sheet of conductive material, said structure including an elongated bus bar section located in a first plane and a stab unit section laterally offset from the longitudinal axis of said bus bar section, said stab unit section including a planar central stab portion bent forward out of said first plane into a plane perpendicular thereto and perpendicular to said axis, said stab unit central section also including first and second planar side stabs in a first common plane perpendicular to said first plane and parallel to said axis, said side stabs positioned on opposite sides of the central stab portion and extending the same distance forward of the first plane.

2. A bus bar contact stab structure as set forth in claim 1 also including a connecting section interposed between said bus bar section and said stab unit section, a first of said side stabs being connected directly to said connecting section and extending forward therefrom.

3. A bus bar contact stab structure as set forth in claim 1 also including a connecting section interposed between said bus bar section and said stab unit section, said first side stab being connected directly to said connecting section and extending forward therefrom, said second side stab being connected directly to said central stab portion, said side stabs being forward of said first plane.

4. A bus bar contact stab structure as set forth in claim 3 in which the first side stab is bent forward from the connecting portion and the latter is in said first plane, said second side stab being bent from said central stab portion away from said first side stab.

5. A bus bar contact stab structure as set forth in claim 1 in which the central stab portion extends more forward than the side stabs and includes a stab section that is closer to the bus bar section then are the side stabs.

6. A bus bar contact stab structure as set forth in claim 1 in which the stab unit section also includes third and fourth planar side stabs positioned in a second common plane parallel to the first common plane and extending forward of the first plane the same distance as the first and second side stabs, and first and third side stabs positioned on one side of the central stab section and the second and fourth side stabs are on the other side of the central stab section.

7. A bus bar contact stab structure as set forth in claim 6 also including a connecting section interposed between said bus bar section and said stab unit section, said first and third side stabs being connected directly to said connecting section and extending forward therefrom.

8. A bus bar contact stab structure as set forth in claim 7 in which the second and fourth side stabs are bent from said central portion away from the first and third stabs.

9. A bus bar contact stab structure as set forth in claim 8 in which the central stab portion extends more forward than the side stabs and includes a stab section that is closer to the bus bar section then are the side stabs.

10. A bus bar contact stab structure as set forth in claim 1 also including another stab unit section of identical construction as the stab unit section, said stab unit sections being spaced along the length of the bus bar section with the central stab portions of the stab unit sections being aligned and equally spaced from the longitudinal axis.

* * * * *